United States Patent
Constans

(10) Patent No.: US 7,916,042 B2
(45) Date of Patent: Mar. 29, 2011

(54) METHOD AND DEVICE FOR PREDICTING THE STOPPING POSITION OF AN AIRCRAFT WHILST LANDING

(75) Inventor: Florian Constans, Riedisheim (FR)

(73) Assignee: Airbus France, Toulouse (FR)

( * ) Notice: Subject to any disclaimer, the term of this patent is extended or adjusted under 35 U.S.C. 154(b) by 542 days.

(21) Appl. No.: 11/773,790

(22) Filed: Jul. 5, 2007

(65) Prior Publication Data

US 2008/0012729 A1     Jan. 17, 2008

(30) Foreign Application Priority Data

Jul. 12, 2006   (FR) ...................................... 06 06333

(51) Int. Cl.
    *G08B 21/00*   (2006.01)
(52) U.S. Cl. .......................... 340/945; 701/16; 73/178 R
(58) Field of Classification Search .................. 340/945, 340/947, 951, 958, 960; 701/16, 5; 73/178 R, 73/178 T
    See application file for complete search history.

(56) References Cited

U.S. PATENT DOCUMENTS

| | | | |
|---|---|---|---|
| 4,316,252 A | 2/1982 | Cooper | |
| 4,319,219 A | 3/1982 | Rein-Weston | |
| 5,142,478 A * | 8/1992 | Crook | 701/16 |
| 5,499,025 A | 3/1996 | Middleton | |
| 6,293,678 B1 * | 9/2001 | Schieferstein | 359/530 |
| 6,978,205 B2 * | 12/2005 | Ryan et al. | 701/120 |
| 7,085,630 B2 * | 8/2006 | Ryan et al. | 701/16 |
| 7,206,698 B2 * | 4/2007 | Conner et al. | 701/301 |
| 2004/0044446 A1 | 3/2004 | Staggs | |
| 2004/0167685 A1 * | 8/2004 | Ryan et al. | 701/16 |
| 2006/0195235 A1 * | 8/2006 | Ishihara et al. | 701/16 |

FOREIGN PATENT DOCUMENTS

WO   0157827   8/2001

OTHER PUBLICATIONS

Preliminary Search Report dated Feb. 13, 2007.

* cited by examiner

*Primary Examiner* — George A Bugg
*Assistant Examiner* — Edny Labbees
(74) *Attorney, Agent, or Firm* — Dickinson Wright PLLC

(57) ABSTRACT

A method and device for predicting the stopping position of an aircraft while landing. The stopping position is predicted from the variation of total energy of the aircraft before the beginning of its flare out.

8 Claims, 3 Drawing Sheets

METHOD AND DEVICE FOR PREDICTING THE STOPPING POSITION OF AN AIRCRAFT WHILST LANDING

FIELD OF THE INVENTION

The present invention relates to a method and a device for predicting the stopping position of an aircraft whilst landing.

BACKGROUND OF THE RELATED ART

It is known that, in the approach phase that has to lead to the landing of an aircraft on a runway, the piloting of that aircraft is particularly difficult. In this approach phase, the pilot has a large amount of information, some of which allows him to avoid a contact between the tail or a wing and the ground, a hard landing or a leaving of the runway. Among this information there is principally the speed of the aircraft, the slope of the aircraft and the height of the aircraft with respect to the ground, these three pieces of information being displayed in the cockpit, such that the pilot can monitor them easily. Moreover, the view of the environment provides the pilot with a perception of his approach plan.

The total energy level of the aircraft, combining its speed and its height, is an essential parameter for estimating the risk of leaving the runway. However, it cannot always be estimated by the pilot. Moreover, the energy level can be altered by the wind.

SUMMARY OF THE INVENTION

The purpose of the present invention is therefore to inform the pilot about the possibility of stopping the aircraft on the runway as a function of the energy level of the aircraft.

For this purpose, according to the invention, the method for predicting the stopping position of an aircraft during the approach phase whilst it is at a current height and descending towards a runway following a current approach path at a current approach speed, said aircraft ideally having to pass, with a reference speed, through a reference approach position disposed at a reference height above the proximal threshold of said runway so that its reference stopping position on the latter is distant from said proximal threshold by a reference distance that can be determined by calculations of the performance of said aircraft, is noteworthy in that, when the current height of said aircraft is greater than said reference height, there is determined, by means of the total energy variation of said aircraft, the horizontal position of a particular point of said current approach path which has the reference height and through which said aircraft passes at the reference speed and said reference distance is added to said horizontal position of said particular point.

The present invention takes advantage of the fact that, with each runway, there is associated a set of procedural rules, including those relating to landing, recommending (or imposing) the passing through the reference approach position with the reference approach speed. Furthermore, the present invention observes that, in civil air transport, the piloting of aircraft complies, as far as it is possible, with these landing procedure rules.

Advantageously, said horizontal position of said particular point of the current approach path is determined from the current horizontal position, the weight, the current approach speed and the current height of the aircraft, as well as from the acceleration of gravity, said reference height, said reference speed and a coefficient, determined from equations of the flight mechanics of said aircraft and representing the maximum loss of total energy of the latter as a function of the horizontal distance traveled by said aircraft on the ground.

The method according to the present invention described above can of course only be used as long as said aircraft has not passed said particular point of the current approach path.

As soon as the aircraft passes, whilst descending, said particular point, the present invention provides for predicting said stopping position by calculating the position of the point at which said aircraft touches the runway and by adding to this calculated position a braking distance, known from the standard performance figures of said aircraft.

The position of the point at which the aircraft touches the runway can be calculated from the height, the longitudinal speed and the vertical speed of said aircraft.

After determination of an aforesaid stopping position, it is checked, both before and after the passage through said particular point of the current approach path, if that aforesaid stopping point is on said runway and the result of this check is displayed close to the pilot of the aircraft, Thus, if necessary the pilot can attempt, knowing the cause, to correct an incorrect energy level or even to carry out a go-around maneuver. For this purpose it is important that the result of the comparison is displayed close to the pilot, in particular on a usual piloting screen frequently looked at by the latter, such as the PFD (Primary Flight Display) screen.

For implementing the method according to the present invention, it is possible to use a device comprising:
  computing means:
    receiving at least information relating to the current horizontal position, the current weight, the current approach speed, the current height of the aircraft, as well as a coefficient representing the total energy loss as a function of the variation of said current horizontal position, the acceleration of gravity, the reference height and the reference speed attached to said reference approach position and said reference distance; and
    calculating a predicted stopping position along the axis of said runway; and
  means of comparison able to verify the location of said predicted stopping position with respect to said runway.

In order to be able to predict a stopping position after the passage through said particular point of the current approach path, said computing means of said device can furthermore receive information concerning the horizontal speed and the vertical speed of said aircraft, as well as said braking distance.

In this device, said means of comparison can control a usual piloting screen on which is displayed a representation of said runway and a symbol, superimposed on said representation of the runway, indicating the evolution of said predicted stopping position during the landing of said aircraft.

BRIEF DESCRIPTION OF THE DRAWINGS

The figures of the appended drawing will give a good understanding of how the invention can be embodied. In these figures, identical references denote similar items.

DETAILED DESCRIPTION OF THE INVENTION

Hereafter, the height of the aircraft has been denoted by H, when it is greater than the reference height, and by h when it is less than the latter.

Figure 1:
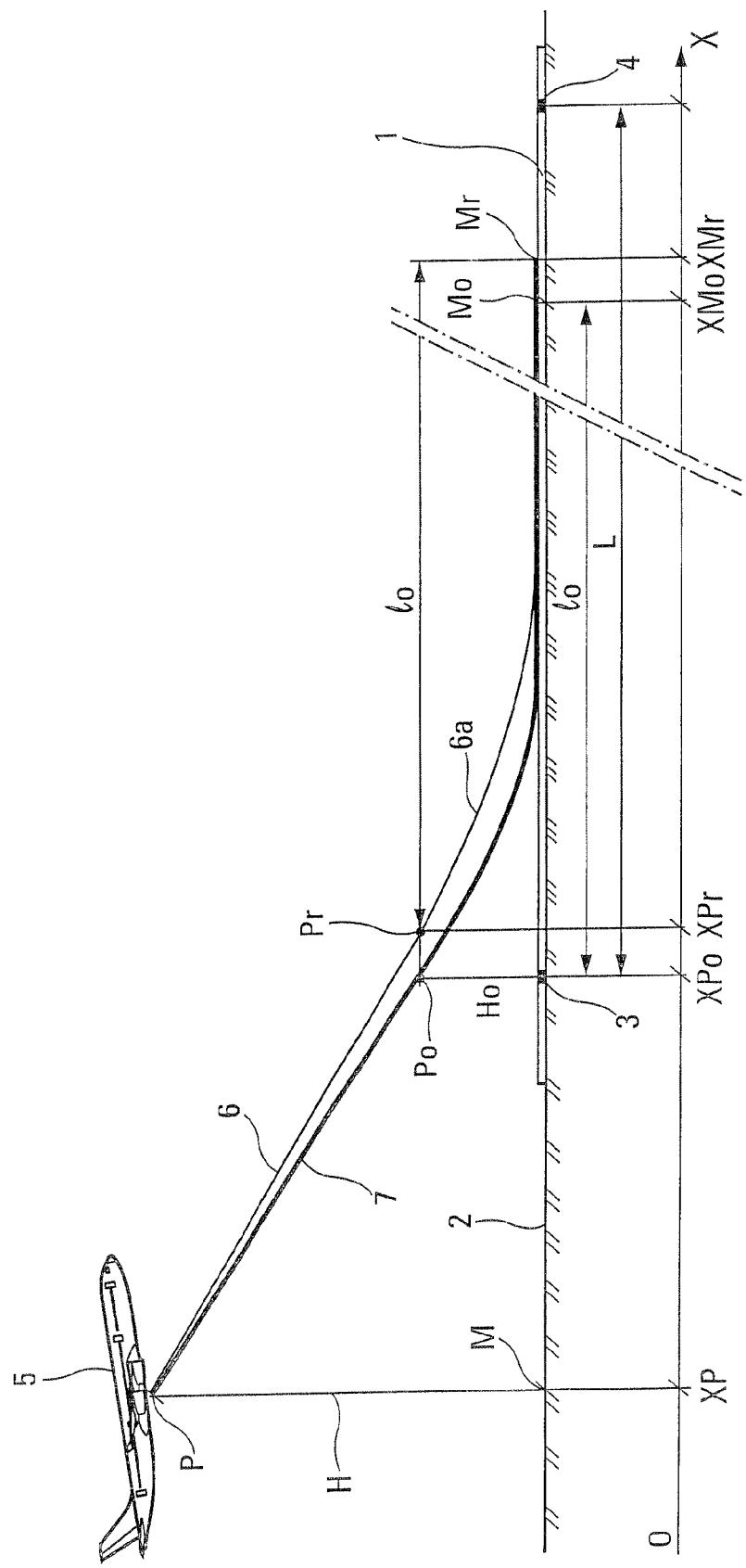
FIG. 1 is a diagram illustrating the method according to the present invention, when the height of the aircraft is greater than said reference height.

In FIG. 1, there has been shown diagrammatically a runway 1 placed on the ground 2 and comprising a proximal threshold 3 and a distal threshold 4 distanced by a length L. Moreover, an X-axis OX has been shown, parallel with the length of the runway 1.

In the situation shown diagrammatically in FIG. 1, an aircraft 5 is in the approach phase on the side approaching the proximal threshold 3 for the purpose of landing on the runway 1. The aircraft 5 is at the current height H and at a point P, vertically above a point M on the ground 2 having the X coordinate XP, and it is following a current approach path 6, whilst descending towards the runway 1 with a current approach speed V.

According to the landing procedure rules attached to the runway 1, the aircraft 5 should ideally be on a reference approach path 7 and it should pass, with a reference speed Vo, through a point Po on that reference approach path 7, disposed at a reference height Ho above said proximal threshold 3. The X coordinate of the reference point Po, and therefore that of the proximal threshold 3, is denoted by XPo.

In the case shown in FIG. 1, the actual height H of the aircraft 5 is greater than said reference height Ho.

If the aircraft 5 were to pass through the point Po of the reference approach path 7, the performance calculations of the aircraft 1 would make it possible to determine the reference distance lo which, starting from the x coordinate XPo, would be necessary for said aircraft to stop completely at an ideal stopping point Mo on the runway 1, of X coordinate XMo, taking account of the reference height Ho and of the reference speed Vo.

In reality, since the aircraft 5 is following the current approach path 6 with the speed V, it will not be able to pass through the point Po. On the other hand, the pilot complying with the landing procedure rules, the aircraft 5 will pass through the point Pr of the current approach path 6 at the reference height Ho, with the reference speed Vo. The X coordinate XPr of the point Pr is of course offset on the OX axis with respect to the X coordinate XPo.

As a consequence of what has been written above regarding the reference distance lo, the real stopping point Mr of the aircraft 6 on the runway 1 (or possibly extending beyond said runway) will have the X coordinate XMr equal to the X coordinate XPr increased by said reference distance lo.

According to the present invention, the determination of the point Pr and of its X coordinate XPr is obtained by calculating the variation of the total energy of the aircraft 5, whose weight is denoted by m.

When the aircraft 5 is at the point P of height H with the speed V, its total energy Ei is equal to $$Ei = \tfrac{1}{2}mV^2 + mgH, \quad (1)$$

g being the acceleration of gravity.

Similarly, when the aircraft 5 is at the point Pr of height Ho with the reference speed Vo, its total energy Ef is equal to $$Ef = \tfrac{1}{2}mVo^2 + mgHo, \quad (2)$$

The variation of total energy ΔE of the aircraft 5 between the points P and Pr is therefore equal to $$\Delta E = \tfrac{1}{2}m(Vo^2 - V^2) + mg(Ho - H) \quad (3)$$

Moreover, from flight mechanics equations concerning the aircraft 5, it is possible to determine a coefficient K (negative), representing the maximum loss of total energy of the aircraft, as a function of the horizontal distance traveled on the ground. The result of this is that the distance XPr–XP between the X coordinates of the points Pr and P is equal to $$XPr - XP = \Delta E / K$$

Thus, the calculation of ΔE makes it possible to predict the X coordinate XPr of the point Pr and therefore the X coordinate, XMr=XPr+lo, of the stopping point Mr. In fact:

$$XPr = XP + \Delta E / K \quad (4) \text{ and}$$

$$XMr = XP + \Delta E / K + lo \quad (5)$$

According to the invention, before the aircraft 5 passes through the point Pr, the position of the stopping point Mr of said aircraft on the runway 1 is therefore easily predicted from:

- the current horizontal position XP, usually calculated or measured (for example by a GPS system) on board the aircraft;
- the coefficient K, resulting from the flight mechanics equations;
- the weight m, usually calculated on board the aircraft;
- the current speed V and the current height H, usually measured on board the aircraft;
- the acceleration of gravity g;
- the reference speed Vo and the reference height Ho, given by the landing procedures attached to the runway 1; and
- the distance lo, resulting from the aircraft performance figures.

During the descent of the aircraft 5 towards the point Pr, the x coordinate XMr is calculated continuously from the equations (3) and (5) such that, the value of that X coordinate XMr is updated at all times.

When the aircraft 5 reaches the point Pr, the pilot begins the landing flare out, such that the portion 6a of the path 6 disposed beyond said point Pr, in the direction of the ground, corresponds to said flare out.

Figure 2:
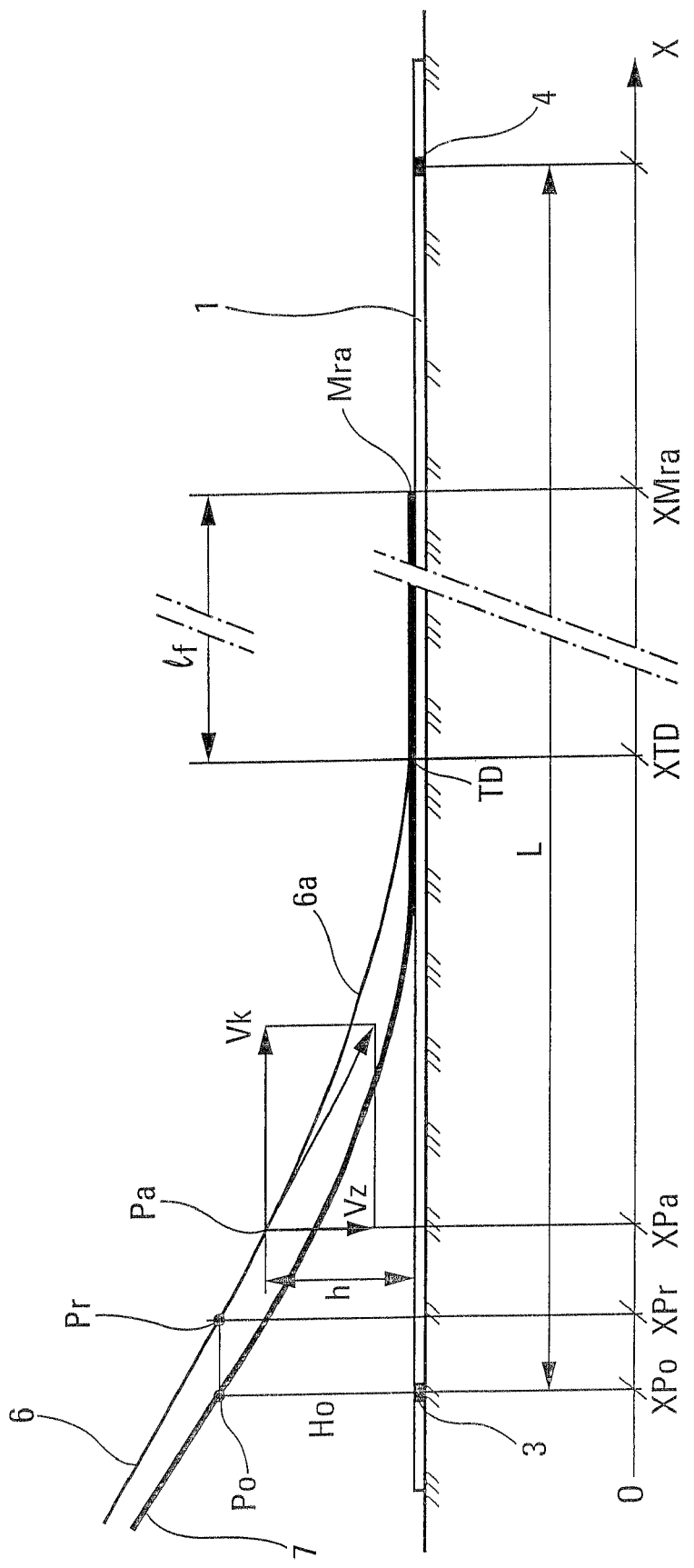
FIG. 2 is a diagram illustrating the method according to the present invention, when the height of the aircraft is less than said reference height.

As shown in FIG. 2, the X coordinate XTD of the point TD at which the aircraft 5 touches the runway 1 can be predicted, from a point Pa of said flare out path 6a, from the height h and from the X coordinate XPa of said point Pa, as well as from the horizontal speed Vk and from the vertical speed Vz of the aircraft 5 at that point Pa. In fact, the ratio h/Vz represents the time difference between the current time and the moment at which the aircraft 5 touches the runway 1, such that the distance XTD–XPa is equal to the product of that ratio and the horizontal speed Vk, that is to say $$XTD - XPa = h \cdot Vk / Vz \quad (6) \text{ or}$$

$$XTD = XPa + h \cdot Vk / Vz \quad (7)$$

Starting from the point TD at which it touches the runway 1, the aircraft must run whilst braking over a distance lf before stopping completely at the point Mra, of X coordinate XMra. This braking distance lf, which depends on the speed at the point TD and on the state of the runway 1, is known from the performance figures of the aircraft 5.

Thus, the X coordinate XMra of the point Mra of total stoppage of the aircraft 5 on the runway 5 can be predicted by the expression $$XMra = XTD + lf = XPa + h \cdot Vk / Vz + lf \quad (8)$$

According to the invention, after the aircraft 5 has passed through the point Pr, the position of the stopping point Mra of said aircraft on the runway 1 is therefore easily predicted from:
- the current horizontal position XPa, determined on board the aircraft;
- the height h, usually measured on board the aircraft;
- the horizontal speed Vk and the vertical speed Vz, usually measured on board the aircraft; and
- the braking distance lf, resulting from the performance figures of the aircraft.

During the descent of the aircraft 5 towards the point TD, the X coordinate XMra is calculated continuously using the equations (7) and (8), such that the value of this X coordinate XMra is updated at all times.

It will be noted that:
- instead of the real vertical speed Vz, it is possible, for the calculation of the ratio representing the variation of said height h as a function of the variation of distance on the ground, either to use a predetermined minimum speed (for example of the order of 1 m/s), or the largest of the measured real vertical speed and the said predetermined minimum speed;
- if, from the standard performance figures of the aircraft 5, the standard deceleration $\Gamma$ (with $\Gamma$ being positive) of the aircraft 5 on the runway 1, depending on the state of the latter is known, it is possible to estimate easily the braking distance if from the expression:

$$lf = \tfrac{1}{2}(VTD^2/\Gamma)$$

in which VTD is the horizontal speed of the aircraft 5 at the time it touches the runway at the point TD.

Figure 3:
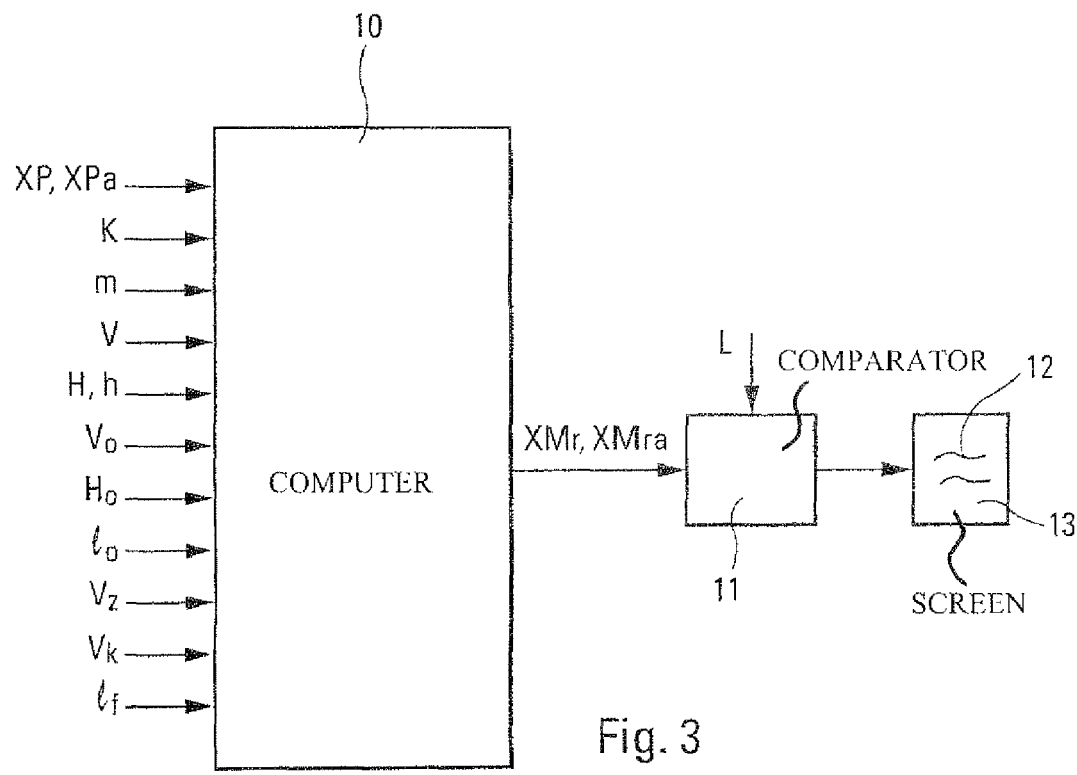
FIG. 3 is the block diagram of a device for implementing the method according to the present invention.

In order to carry out the calculations corresponding to the expressions (1) to (8) mentioned above, it is possible to use the device shown diagrammatically in FIG. 3. This device comprises a computer 10 having in memory the acceleration of gravity g, receiving on its inputs the information XP, XPa, K, m, V, H, h, Vo, Ho, lo, Vz, Vk and if defined above and providing at its output either the prediction of the stopping position XMr if the height H of the aircraft 5 is greater than Ho, or the prediction of the stopping position XMra if the height h of the aircraft 5 is less than Ho.

The device shown in FIG. 3 furthermore comprises a comparator 11 (which can be an integral part of the computer 10) comparing the X coordinates of the predicted stopping positions XMr and XMra with the length L of the runway 1 and able to display the result 12 of this comparison on a screen 13.

Such a screen 13 can be the one called the PFD (Primary Flight Display) in aeronautical terminology in order to be close to the pilot.

Figures 4A, 4B, 4C:
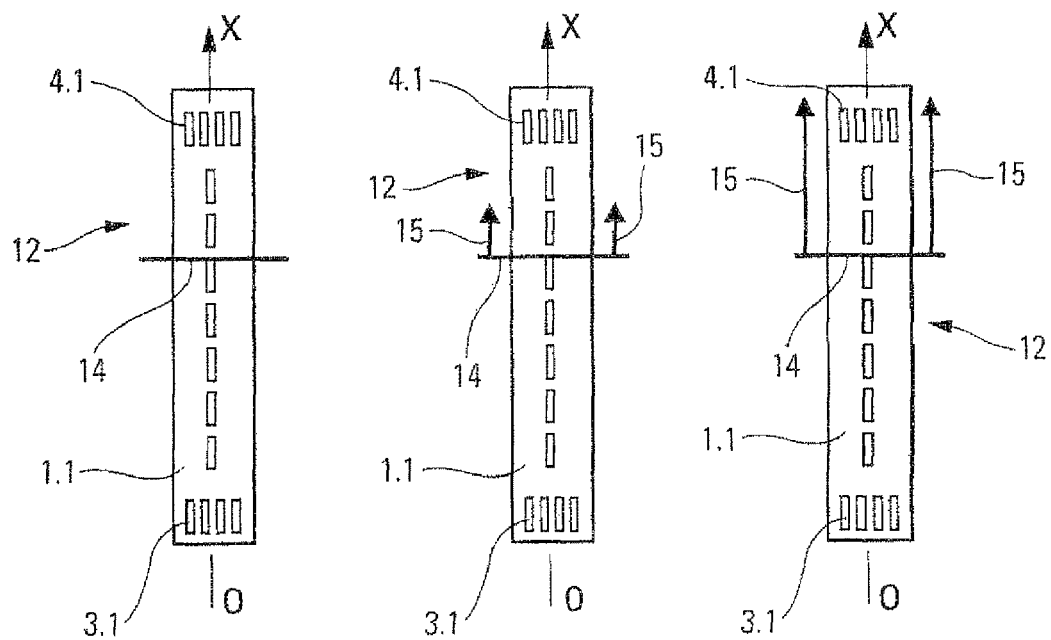
FIGS. 4a, 4b and 4c show examples of prediction display resulting from the implementation of the method of the invention.

In FIGS. 4a, 4b and 4c, there has been shown an example display controlled by the comparator 11 on the screen and representing an image 1.1 of the runway 1, with the images 3.1 and 4.1 of the thresholds 3 and 4. Moreover, these figures comprise a transverse bar 14, superimposed on the image 1.1 and representative of the prediction made:
- in FIG. 4a, the bar 14 indicates a predicted stopping point Mr or Mra, in a correct landing situation;
- in FIG. 4b, two lateral arrows 15 indicate the tendency of the movement of said bar 14 over a given time scale; and
- in the case where the predicted stopping point Mr or Mra is close to the distal threshold 4, the lateral arrows 15 become bigger, change color, flash, etc., in order to draw the pilot's attention to a possible longitudinal overshoot of the runway.

The invention claimed is:

1. A method for predicting a stopping position of an aircraft during an approach phase while the aircraft is at a current height and descending towards a runway following a current approach path at a current approach speed, said aircraft passing, with a reference speed, through a reference approach position disposed at a reference height above a proximal threshold of said runway so that a reference stopping position on the runway is distant from said proximal threshold by a reference distance that can be determined by calculations of the aircraft's performance, the method comprising:
   when said current height of said aircraft is greater than said reference height,
   calculating, using a computing device on board the aircraft, a variation of total energy of said aircraft between a point of said current approach path which has the current height and a particular point of said current approach path which has the reference height and through which said aircraft passes at the reference speed;
   determining, using said computing device, from said variation of the total energy, the horizontal position of said particular point; and
   adding, using said computing device, said reference distance to said horizontal position of said particular point.

2. The method as claimed in claim 1, wherein said horizontal position of said particular point of the current approach path is determined from the current horizontal position, the weight, the current approach speed and the current height of the aircraft, as well as from the acceleration of gravity, said reference height, said reference speed and a coefficient, determined from equations of flight mechanics of said aircraft and representing a maximum loss of total energy of the latter as a function of horizontal distance traveled by said aircraft on the ground.

3. The method as claimed in claim 1, wherein, when said aircraft has passed, whilst descending, said particular point of the current approach path, said stopping position of said aircraft is predicted by calculating the position of the point at which said aircraft touches the runway and by adding to this calculated position a braking distance, known from standard performance figures of said aircraft.

4. The method as claimed in claim 3, wherein the position of the point at which the aircraft touches the runway is calculated from the height, the longitudinal speed and the vertical speed of said aircraft.

5. The method as claimed in claim 1, wherein it is checked if the predicted stopping position is on said runway and the result of this check is displayed close to a pilot of the aircraft.

6. A device for the implementation of the method as claimed in claim 1, wherein the device comprises:
   the computing device:
      receiving at least information relating to the current horizontal position, the current weight, the current approach speed, the current height of the aircraft, as well as a coefficient representing total energy loss as a function of a variation of said current horizontal position of the aircraft, the acceleration of gravity, the reference height and the reference speed attached to said reference approach position and said reference distance; and calculating a predicted stopping position along an axis of said runway; and a comparator that verifies the location of said predicted stopping position with respect to said runway.

7. The device as claimed in claim 6, further comprising a prediction section that predicts, when said aircraft has passed, whilst descending, said particular point of the current approach path, said stopping position of said aircraft by calculating the position of the point at which said aircraft touches the runway and by adding to the calculated position a braking distance, known from standard performance figures of said aircraft, wherein said computing device furthermore receives information concerning the horizontal speed and the vertical speed of said aircraft, as well as said braking distance.

8. The device as claimed in claim 6, wherein said comparator controls a usual piloting screen on which is displayed a representation of said runway and a symbol, superimposed on said representation, indicating the evolution of said predicted stopping position during the landing.

* * * * *